(12) United States Patent
Crumm et al.

(10) Patent No.: US 8,352,097 B2
(45) Date of Patent: Jan. 8, 2013

(54) METHOD FOR MANAGING POWER BOOST IN A FUEL CELL POWERED AERIAL VEHICLE

(75) Inventors: Aaron T. Crumm, Ann Arbor, MI (US);
Timothy LaBreche, Ann Arbor, MI (US); Gregory Ohl, Ann Arbor, MI (US); Nathan Ernst, Ann Arbor, MI (US); Michael Gorski, Dexter, MI (US)

(73) Assignee: Adaptive Materials, Inc., Ann Arbor, MI (US)

( * ) Notice: Subject to any disclaimer, the term of this patent is extended or adjusted under 35 U.S.C. 154(b) by 580 days.

(21) Appl. No.: 12/565,565

(22) Filed: Sep. 23, 2009

(65) Prior Publication Data
US 2011/0071707 A1 Mar. 24, 2011

(51) Int. Cl.
*G01C 23/00* (2006.01)
(52) U.S. Cl. ............... 701/3; 701/22; 903/903; 903/944
(58) Field of Classification Search ............... 701/3, 22; 903/903, 944; 318/441; 320/104
See application file for complete search history.

(56) References Cited

U.S. PATENT DOCUMENTS

| | | | |
|---|---|---|---|
| 4,913,380 A | 4/1990 | Vardaman et al. | |
| 8,084,988 B2 * | 12/2011 | Fujino et al. | 320/104 |
| 2003/0230671 A1 | 12/2003 | Dunn | |
| 2005/0048335 A1 * | 3/2005 | Fields et al. | 429/22 |
| 2005/0151006 A1 | 7/2005 | Krill et al. | |
| 2009/0112384 A1 * | 4/2009 | Jeon et al. | 701/22 |
| 2009/0289589 A1 * | 11/2009 | Fujino et al. | 318/441 |

* cited by examiner

*Primary Examiner* — Gertrude Arthur Jeanglaude
(74) *Attorney, Agent, or Firm* — Endurance Law Group PLC

(57) ABSTRACT

An aerial vehicle is configured to operate in a base fuel cell operating mode and a fuel cell boost operating mode. A method for controlling the aerial includes providing a base fuel cell upper power limit. The method further includes controlling the fuel cell power level below the base fuel cell upper power limit when the aerial vehicle is operating in the base fuel cell operating mode. The method further includes operating the fuel cell above the base upper fuel cell power limit when the aerial vehicle is operating in the fuel cell boost operating mode.

20 Claims, 14 Drawing Sheets

METHOD FOR MANAGING POWER BOOST IN A FUEL CELL POWERED AERIAL VEHICLE

BACKGROUND

The statements in this section merely provide background information related to the present disclosure and may not constitute prior art.

Aerial vehicles are utilized in increasingly diverse applications such as, for example, air and surface combat, reconnaissance, logistics, research, and rescue applications. Aerial vehicle designs include very diverse shapes, sizes, configurations and characteristics, wherein each of the different aerial vehicle designs can be optimized for one or more specific application. For certain applications, fuel cell powered aerial vehicles are highly desirable because fuel cells provide a robust, low vibration, low emission, high-energy density power source for the aerial vehicle. Therefore, fuel cell powered aerial vehicles can operate for extended time period and over extended distances. Further, aerial vehicles utilizing fuel cells produce low noise level and low thermal signatures, which makes detection difficult.

Aerial vehicles can utilize hybrid fuel cell power systems comprising a fuel cell and a secondary battery. Both the secondary battery and the fuel cell are electrically coupled to a power bus supplying power to system components of the aerial vehicle. The fuel cell can continuously convert stored fuel to electrical power to the power bus at high energy efficiencies. The secondary battery can provide electrical power to the power bus by discharging the secondary battery and can receive electrical power from the power bus to charge the secondary battery.

Fuel cell power and battery power can be actively managed to efficiently power components of the aerial vehicle including the propulsion module, the system control, sensing components, and payload components of the aerial vehicle. For example, the secondary battery can be discharged to meet short-term component power requirements; however, typically much less energy is stored as battery charge than is stored as fuel supplied to the fuel cell. Therefore, while the secondary battery can be discharged to power aerial vehicle components for short periods of time, when the rechargeable battery is discharged over extended periods of time the battery state-of-charge will drop to a lower state-of-charge limit making battery power unavailable.

Therefore, new autonomous and manual methods for efficiently controlling power and energy within aerial vehicles are needed.

SUMMARY

An aerial vehicle is configured to operate in a base fuel cell operating mode and a fuel cell boost operating mode. A method for controlling the aerial includes providing a base fuel cell upper power limit. The method further includes controlling the fuel cell power level below the base fuel cell upper power limit when the aerial vehicle is operating in the base fuel cell operating mode. The method further includes operating the fuel cell above the base upper fuel cell power limit when the aerial vehicle is operating in the fuel cell boost operating mode.

Further the aerial vehicle is configured to operate in a base battery operating mode and a battery boost operating mode. A method for controlling the aerial includes providing a base battery upper power limit. The method further includes controlling the battery power level below the base battery upper power limit when the aerial vehicle is operating in the base battery operating mode. The method further includes operating the battery above the base upper fuel cell power limit when the aerial vehicle is operating in the battery boost operating mode.

Figure 1:
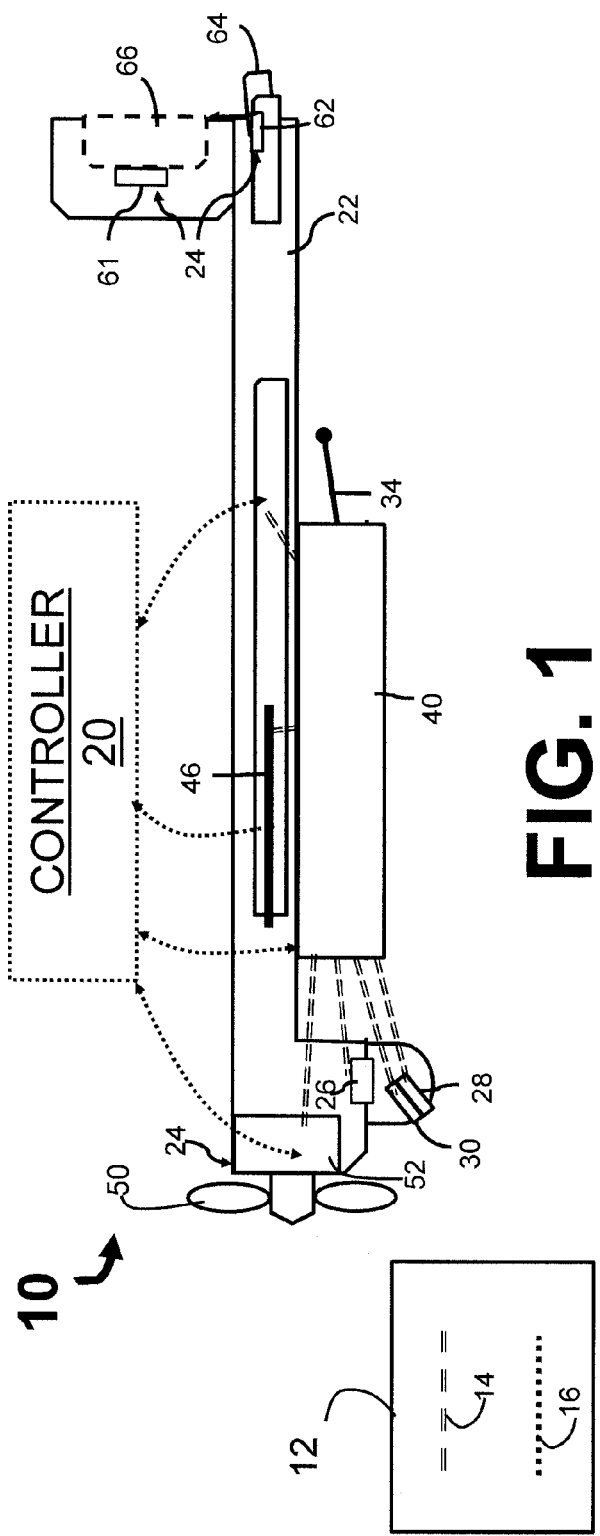
FIG. 1 is a side view of an aerial vehicle in accordance with an exemplary embodiment of the present disclosure.

It should be understood that the appended drawings are not necessarily to scale, presenting a somewhat simplified representation of various preferred features illustrative of the basic principles of the invention. The specific design features of the fuel cell will be determined in part by the particular intended application and use environment. Certain features of the illustrated embodiments have been enlarged or distorted relative to others for visualization and understanding. In particular, thin features may be thickened for clarity of illustration. All references to direction and position, unless otherwise indicated, refer to the orientation of the device illustrated in the drawings.

DETAILED DESCRIPTION

In the present disclosure, a method for controlling a fuel cell aerial powered vehicle is described in accordance with an exemplary embodiment. The method for controlling the fuel cell aerial vehicle has several advantages over previous method for controlling a fuel cell powered aerial vehicle. For example, the method provides more efficient utilization of the fuel cell energy, thereby increasing the stored energy to volume ratio and the stored energy to weight of the aerial vehicle.

Although the aerial vehicles are described herein as utilizing hybrid fuel cell power systems, in alternate embodiments the aerial vehicle utilizing hybrid photovoltaic power systems and hybrid engine power systems can utilize control concepts described herein.

FIG. 1 depicts an aerial vehicle 10 including a fuel cell hybrid power system 40. The aerial vehicle 10 further includes a control system 20, an airframe 22, and a propulsion and flight dynamics control module 24, a gimbaled actuator 26, a designator 28, a video camera 30, and a communications system 34.

The exemplary aerial vehicle 10 is an unmanned aerial vehicle ("UAV") or alternately, an unmanned aerial system ("UAS") configured to perform missions such as, for example, loitering, designating, identifying, traveling, targeting, tracking, sprinting and climbing as will be discussed in greater detail herein below. However, certain aspects of the method for controlling an aerial vehicle discussed herein are applicable to other aerial vehicles and can be utilized while performing other missions not specifically discussed herein.

Figure 2:
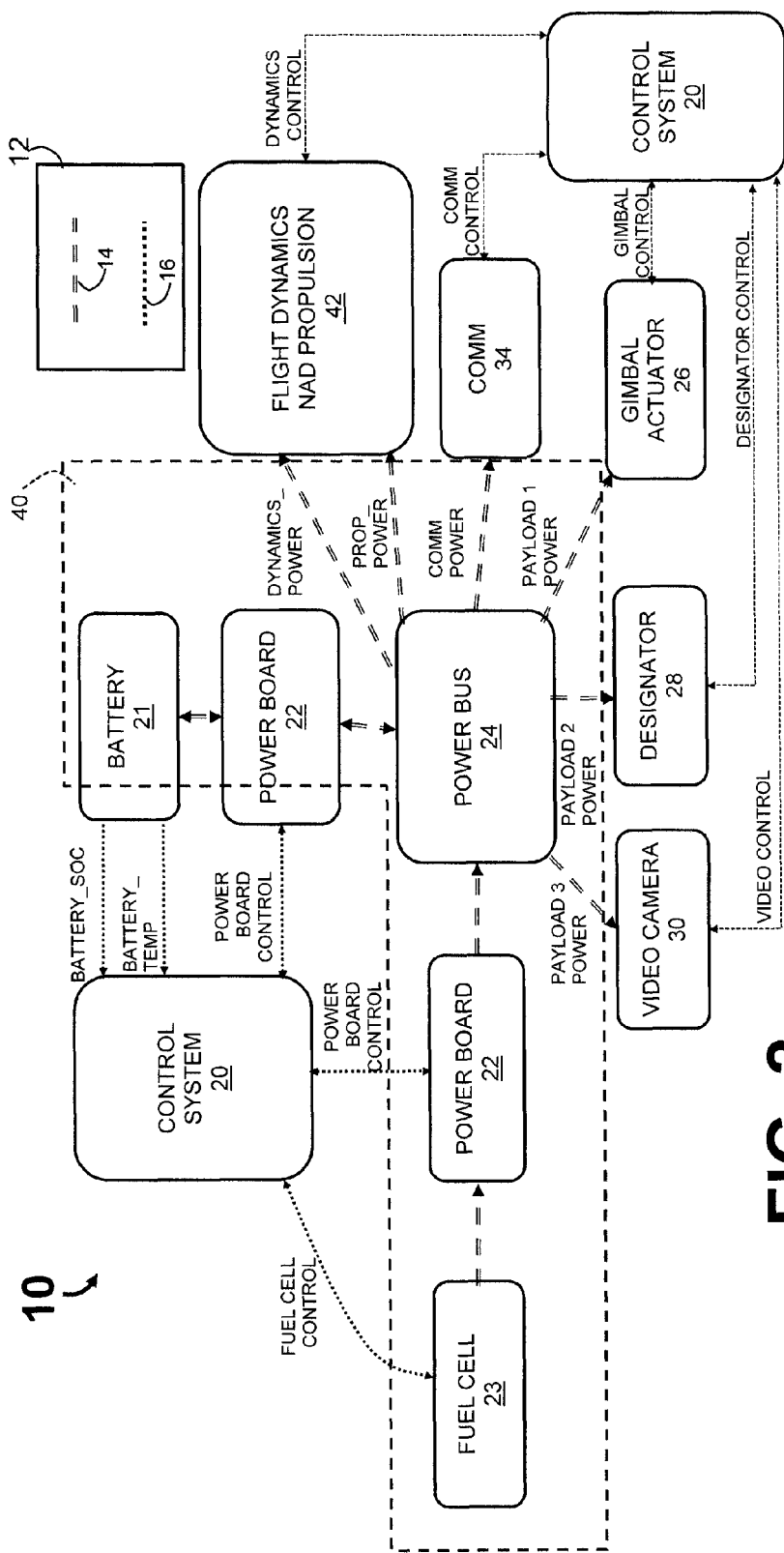
FIG. 2 is a schematic power and signal flow diagram of the aerial vehicle of FIG. 1.
Figure 3:
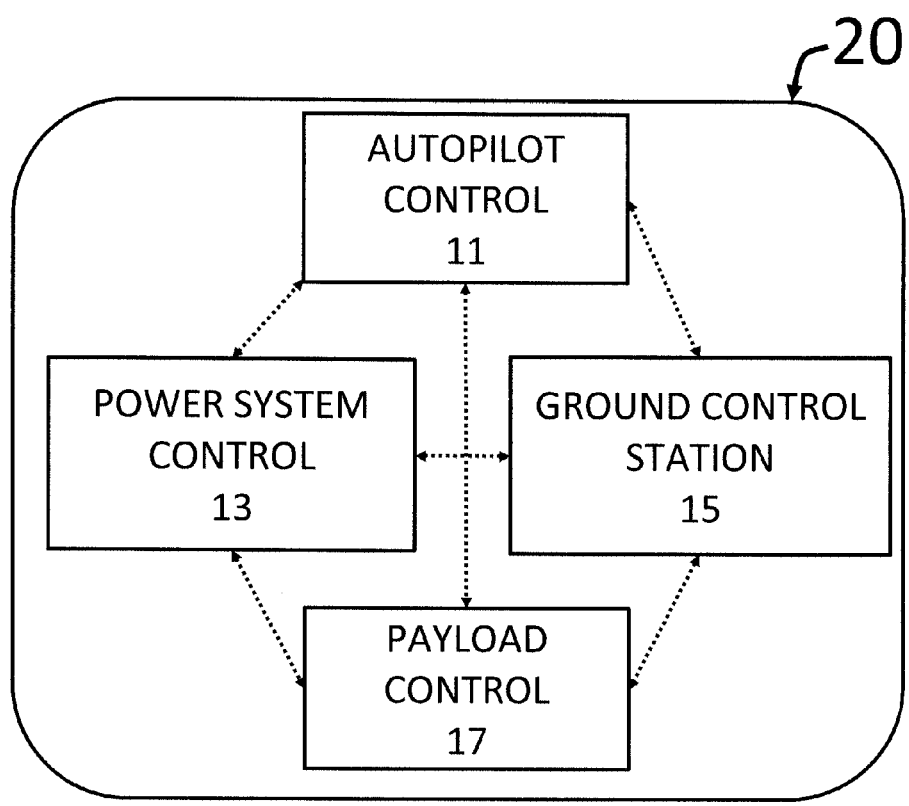
FIG. 3 is a schematic signal flow diagram of a control system of the aerial vehicle of FIG. 1.
Figure 4:
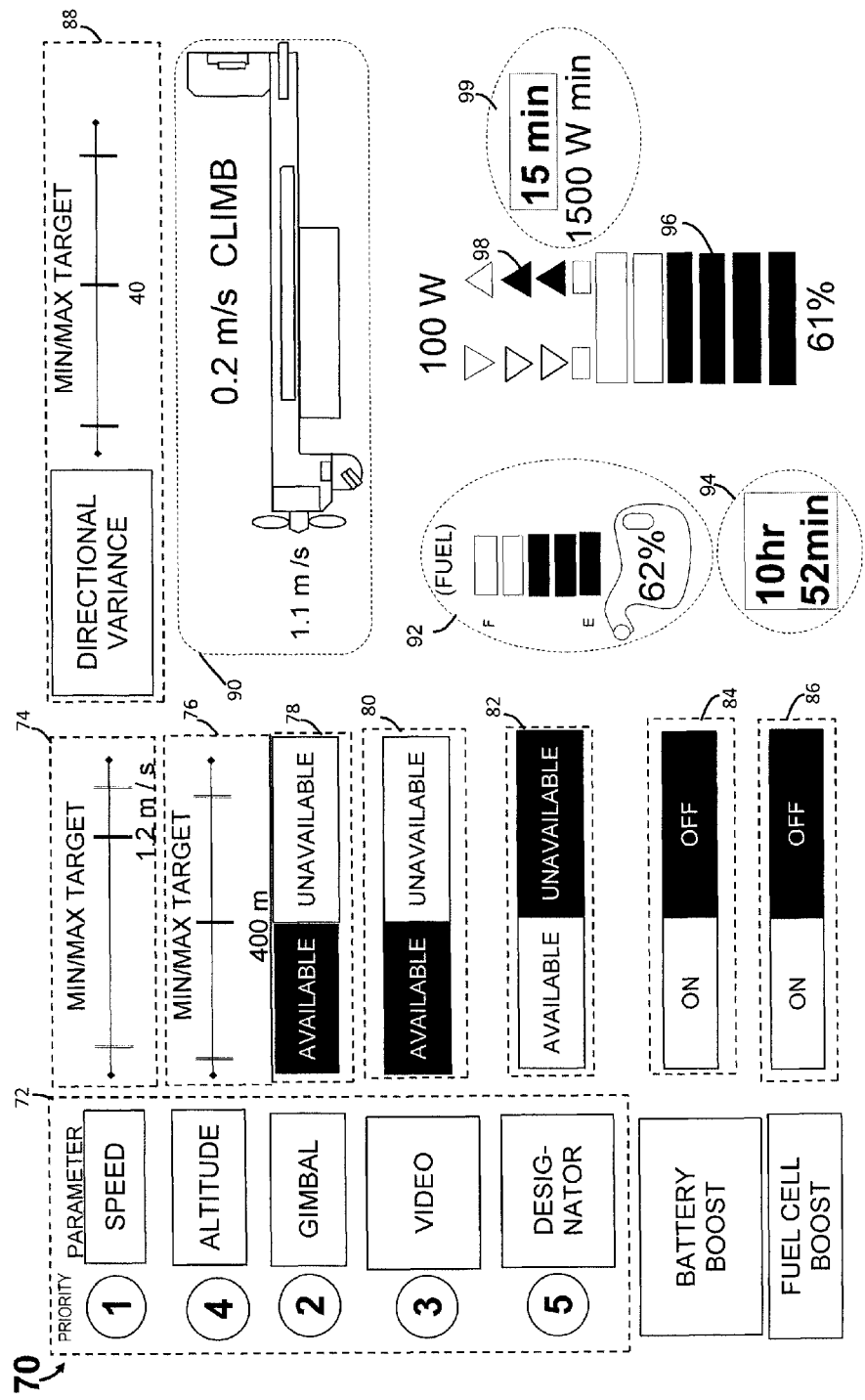
FIG. 4 is a view of a graphics user interface for operating the aerial vehicle of FIG. 1.

FIG. 1 depicts the control system 20 outside the aerial vehicle 10 to illustrate signal communications between the control system 20 and various components of the aerial vehicle 10, and FIG. 2 depicts two separate boxes for control system 20 to clearly illustrate signal communications between the control system 20 and several system components. As shown in the legend 12, power flow between components of the aerial vehicle 10 is depicted by double dashed lines 14 and signal flow is depicted by signal dotted lines 16. The control system 20 comprises circuitry, devices, and resident program instructions that can be executed to monitor and control operation of the aerial vehicle 10. Referring to FIG. 3, the control system 20 comprises distributed control and decision-making units including an autopilot controller 11, a power system controller 13, a payload component controller 15, and a ground system controller 17. The autopilot controller 11 is configured to manage the propulsion and flight dynamics module 24 of the aerial vehicle 10. The power system controller controls power flow within the power system 40. The payload component controller 15 is configured to manage payload component operation including gimbaled actuator 26, the designator 28, and the video camera 30. The ground system controller 17 can control telemetry, can provide mission commands, can provide user information and input user command through a graphic a user interface 50 (FIG. 4).

The propulsion and flight dynamics control module 24 comprises propulsion components, including an electric motor 52 and a propeller 54; steering components including a an elevator actuator 61, an elevator 64, a rudder actuator 62, and rudder 66; and sensing components including a pitot tube 46.

The electric motor 52 is signally connected to the control system 20 such that the control system 20 can command a selected electric motor power level. The electric motor 52 and a propeller 54 are coupled through a gearbox (not shown), and the electric motor 52 drives rotational movement of the propeller 54, which provides thrust to the aerial vehicle 10.

The control system 20 is signally connected to the elevator actuator 61 and the rudder actuator 62 to provide commands to control the position of the elevator 64 and the ruder 66, respectively. Although the elevator 64 and the rudder 66 are depicted for illustration purposes, it is to be understood that flight dynamics control of the aerial vehicle 10 utilizes complex control routines for controlling the position of the flaps, elevator, ailerons, and the rudder as understood by those skilled in the art. By controlling the electric motor 52 power level along with controlling positions of any combination of slats, flaps, elevators, ailerons and the rudder of the flight, the controller 20 can control the speed, pitch, roll and yaw (thereby controlling climb and decent rate and rate of turn) of the aerial vehicle 10.

Along with the pitot tube 46, the propulsion and flight dynamics control module 24 further includes other sensing components including a pressure sensor (not shown), a temperature sensor (not shown), and a GPS unit (not shown). Each of the sensors are monitored by the control system 20 such that the control system 20 executes control algorithms based on sensed feedback to control the aerial vehicle 10. The pitot tube 46 is provided to measure a dynamic pressure, which can be utilized in combination with the GPS unit to determine an aerial vehicle speed.

The airframe 22 comprises a body, a tail portion and wings. The airframe 22 provides the mechanical structure for mounting and supporting the electronics, control components and the propulsion components of the aerial vehicle 10. The hybrid power device 40 provides power to the portions of the control system 20 residing on the aerial vehicle 10, the propulsion module 24, the gimbaled actuator 26, the laser designator 28, the video camera 30, and the flight dynamics and propulsion control module 42.

The gimbaled actuator 26 includes pivoted support and positional control for 3-dimentionally repositioning the laser designator 28 and the video camera 30 to operate at a desired line-of-sight. In an exemplary embodiment, the position of the gimbaled actuator 26 is controlled by an operator wirelessly communicating with the controller 20 through the communications system 34. In alternate embodiments, the gimbaled device can be controlled autonomously, for example, the gimbaled device 26 can receive control algorithms for autonomously tracking a moving target by utilizing the video camera 30 and image recognition software.

The laser designator 28 provides targeting for laser guided bombs, missiles and precision artillery munitions (collectively, hereafter referred to as "laser-guided munitions"). In particular, the laser designated 28 can emit a series of coded pulses of laser-light, wherein the laser-light bounces off the target and wherein the laser-light can be detected by a seeker on laser-guided munitions.

The exemplary video camera 30 captures high definition video and transmits the high definition videos to a ground controller (not shown) via the communications system 34. The ground controller can utilize the high definition videos in conjunction with video processing software to identify potential targets and to track movement of targets.

Although in an exemplary embodiment including three payloads, the gimbal actuator 26, the laser designator 28, and the video camera 30, are discussed, in alternate embodiments, the aerial vehicle 10 can comprise various numbers of payloads and a variety of payload types. For example, and by no means limiting, the aerial vehicles 10 can include thermal infrared, video surveillance sensors, hyperspectral sensors, designators, acoustic sensors, georegistration sensors, chemical sensors, and radar and lidar sensors.

FIG. 2 is a schematic diagram depicting power flow 14 and signal flow 16 within the aerial vehicle 10. The control system 20 manages power flow within the power system 40. The power system 40 includes a power board 22 ('POWER BOARD'), a power bus 24 ('POWER BUS'), a battery 21 ('BATTERY'), and a fuel cell module 23 ('FUEL CELL').

The power board 22 comprises a voltage converter for converting a fuel cell voltage to a power bus voltage and further comprises a voltage converter for converting a battery voltage to the power bus voltage. The power board sends and receives power board control signals ('POWER BOARD CONTROL') to and from the control system 20. In particular, the power board 22 includes sensors to measure voltage and current outputted at the fuel cell module 23 and measures voltage and current outputted at the battery 28. The control system 20 can monitor the sensors of the power board 22 and can control voltage conversion between the fuel cell module 23 and the power bus 24 and between the battery 21 and the power bus 24. In alternate embodiments, other sensors and voltage converters can be utilized to meet power requirements of power consuming devices of the aerial vehicle 10.

The power bus 24 comprises an electrically conductive network configured to route power from the energy conversion devices (the rechargeable battery 21 and the fuel cell module 23) to supply electric power to devices external to the hybrid power device 40. Each of the devices external to the hybrid power device 40 can be connected to the power bus through power connection ports (not shown) or can hardwired to the power bus 24.

The exemplary battery 21 can comprise any of several rechargeable battery technologies including, for example, nickel-cadmium, nickel-metal hydride, lithium-ion, and lithium-sulfur technologies. In alternative embodiments, other reversibly energy storage technologies such as ultracapacitors can be utilized in addition to or instead of the rechargeable battery 21. Further, in alternate embodiments, multiple energy storage devices can be utilized within aerial vehicles. The control system 20 receives information from internal sensors within the battery 21, to monitor battery state of charge ('BATTERY_SOC') and to monitor temperatures at multiple locations of the battery 21 ('BATTERY_TEMP).

The fuel cell module 23 includes a fuel cell stack and an onboard fuel reservoir along with various pumps and/or blowers for routing air to a cathode of the fuel cell stack at a controlled rate and for routing air and fuel to a reformer and subsequently to an anode of the fuel cell stack at a controlled rate.

The exemplary fuel cell stack comprises a plurality of solid oxide fuel cell tubes, along with various other components, for example, air and fuel delivery manifolds, current collectors, interconnects, and like components for routing fluid and electrical energy to and from the component cells within the fuel cell stack. In alternate embodiments, an aerial vehicle can utilize various fuel cell technologies and various fuel cell shapes. The solid oxide fuel cell stack includes a thermally insulated high temperature portion that includes fuel cell tubes configured to electrochemically transform the reformed fuel into electricity and exhaust gas. The insulative body comprises porous thermally insulative material capable of withstanding the operating temperatures of the fuel cell stack, that is, temperatures of up to 1000 degrees Celsius. The fuel cell module 23 further comprises a heat exchange manifold for transferring heat from fuel cell exhaust gas to air inputted to the fuel cell stack. The actual number of solid oxide fuel cell tubes depends in part on size and power producing capability of each tube and the desired power output of the solid oxide fuel cell tubes. Each solid oxide fuel cell includes an internal reformer disposed therein for converting raw fuel to reformed fuel.

The fuel cell stack further includes a plurality of sensors including a fuel flow rate sensor, an anode air flow rate sensor, a cathode air flow rate sensor, an internal reformer temperature sensor and a fuel cell tube exhaust temperature sensor. The control system 20 communicates with the fuel cell module 23 via signals ('FUEL CELL CONTROL'). By monitoring the plurality of sensors and by transmitting command signals to the fuel cell stack 23, the controller 20 can control air and fuel flow rates within the fuel cell module 23. The control system 20 can determine fuel consumption and a remaining fuel level by monitoring fuel flow rate within the fuel cell module 23 over time. The control system 20 provides signals to control components of the fuel cell stack including the anode air blower, the cathode blower and the fuel valve to deliver fuel and air at a calibrated rates based on a desired air/to fuel ratio and based on a desired fuel utilization level.

Exemplary fuels for utilization within the fuel cell stack include a wide range of hydrocarbon fuels. In an exemplary embodiment, the fuel comprises an alkane fuel and specifically, propane fuel. In alternative embodiments, the fuel can comprise one or more other types of alkane fuel, for example, methane, ethane, propane, butane, pentane, hexane, heptane, octane, and the like, and can include non-linear alkane isomers. Further, other types of hydrocarbon fuel, such as partially and fully saturated hydrocarbons, and oxygenated hydrocarbons, such as alcohols and glycols, can be utilized as fuel that can be converted to electrical energy by the fuel cell stack. The fuel also can include mixtures comprising combinations of various component fuel molecules examples of which include gasoline blends, liquefied natural gas, JP-8 fuel and diesel fuel.

Referring to FIG. 4 a user interface 70 is provided to allow a user to select priorities levels of secondary operations and to control parameters of the aerial vehicle 10. As used herein, the term "secondary operations" refer to operations that are not included in the flight operation power requirement that is, operations not required to maintain the aerial vehicle in flight.

The user interface 70 includes a priority selector 72, a speed controller 74, an altitude controller 76, a gimbaled actuator selector 78, a video selector 80, a designator selector 82, a battery boost selector 84, a fuel cell boost selector 86, a directional variance selector 88, a flight speed and altitude display 90, a fuel gage 92, a fuel duration gage 94, a battery state of charge gage 96, a hybrid power display 98, and a battery duration display 99.

The priority selector 72 determines priority of secondary power operations including meeting a target speed, meeting a target altitude, providing power to the gimbaled actuator 26, providing power to the video camera 30 and providing power to the laser designator 28. Although the priority selector allows a user to select priority in meeting a target speed and altitude along with priorities of each of the payloads, the control system 20 selects a higher priority for meeting a minimum speed and minimum altitude required for flight over the priority of each of the secondary power operations including the payload operations.

The speed controller 74 allows a user to select a target speed between a minimum speed and a maximum speed, and likewise, the altitude controller 76 allows a user to select a target altitude between a minimum altitude and a maximum altitude. The control system 20 controls the flight dynamics module 72 and provides power to the engine 52 based on the target speed and altitude.

The gimbaled actuator selector 78 allows a user to determine whether the gimbaled actuator 26 is an "on" state receiving power from the power system 40 or in an "off" unpowered state. Likewise, the video selector 80 and the designator selector 82 allow a user to determine whether each of the video camera 30 and the designator 28 are in an "on" state or an "off" state, respectively. When either the video selector 80 or the designator selector 82 is in an "on" state the control system 22 automatically selects the gimbaled actuator 26 as a priority higher than the video camera 30 and the designator 28.

The battery boost selector 84 allows a user to select whether the aerial vehicle 10 is operating in a base battery operating mode ('OFF') or whether the aerial vehicle 10 is operating in a battery boost operating mode ('ON'). When the aerial vehicle 10 is operating in the base battery operating mode, the control system 20 selects a base battery upper power limit, and the control system 20 controls power flow from the battery 21 to the power bus 24 such that the base battery upper power limit is not exceeded. When the aerial vehicle 10 is operating in the battery boost operating mode, the control system 20 selects a battery boost upper battery power limit, and the control system 20 controls power flow from the battery 21 to the power bus 24 such that the battery boost upper power limit is not exceeded.

For each set of operating conditions, the battery boost upper power limit is a higher power than the base battery upper power limit such that when the aerial vehicle 10 is operating in the battery boost operating mode, a higher battery discharge rate and a lower minimum battery state of charge are allowed by the control system 20. In one embodiment, the battery boost upper power limit and the base battery upper power limit are dynamically determined based aerial vehicle operating (present and future) conditions and specifically based on a battery state of charge, a battery temperature, and a measured battery output power.

The base battery upper power limit is a battery power level associated with long-term battery durability. The boost upper power limit may degrade operational lifetime of the battery 21 and therefore, is preferably only utilized for short time periods. However, during certain situations, it is desirable for the battery to exceed the base upper power limit, for example, to complete a significant mission objective, to maintain the aerial vehicle in flight, or to prevent damage to components of the aerial vehicle 10 and therefore, the boost battery operating mode can be selected in these situations. Further, for operations that only occur for short time period, for example targeting utilizing a laser designator, it may be more preferable to operate the battery in the boost battery operating mode than utilizing a heavier, higher power battery within the aerial vehicle 10. Further, it may preferable to operate in the aerial vehicle in the battery boost operating mode to power the propulsion module when at least one of a steep climb rate or a high velocity is required. For example, high power propulsion may be desired when performing evasive maneuvers, when tracking a target, or for traveling a desired distance in a desired time period. In one embodiment, the battery boost operating mode allows the battery 21 to operate under the lower state of charge limit of the base battery operating mode. For example in one embodiment, when in the battery 21 is the battery boost operating mode, the battery 21 can operate at less than half the lower state of charge limit of the base battery operating mode.

The fuel cell boost selector 86 allows a user to select whether the aerial vehicle 10 is operating in a base fuel cell operating mode ('OFF') or whether the aerial vehicle 10 is operating in a fuel cell boost operating mode ('ON'). When the aerial vehicle 10 is operating in the base fuel cell operating mode, the control system 20 selects a base fuel cell upper power limit, and the control system 20 controls power flow from the fuel cell module 23 to the power bus 24 such that the base fuel cell upper power limit is not exceeded. When the aerial vehicle 10 is operating in the fuel cell boost operating mode, the control system 20 selects a fuel cell boost upper battery power limit, and the control system 20 controls power flow from the fuel cell module 23 to the power bus 24 such that the fuel cell boost upper power limit is not exceeded.

For each set of operating conditions, the fuel cell boost upper power limit is a higher power level than the base fuel cell upper power limit such that when the aerial vehicle 10 is operating in the fuel cell boost operating mode a high maximum fuel cell power level can commanded by the control system 20. To command higher operating power, the control system 20 can increase the current drawn from the fuel cell module 23 and can increase the fuel consumption within the fuel cell module 23. By operating in the boost operating mode, the boost operating mode may operate at a higher temperature. In an exemplary solid oxide fuel cell, the fuel cell operates at an operating temperature of greater than 25 degrees Celsius when in the boost operating mode than when operating at a base upper power limit of the base operating mode.

The fuel cell boost upper power limit and the base fuel cell upper power limit are dynamically determined based fuel cell operating power, fuel flow rate, and a measured fuel cell temperature (that is, one of the temperature measured at the internal reformer or the temperature measured at the exit end of the fuel cell tubes). The base fuel cell upper power limit is a fuel cell power level associated with long-term fuel cell durability. The boost fuel cell power limit may degrade operational lifetime of the fuel cell module 23 and therefore, is preferably only utilized for short time periods. For example, operating the aerial vehicle in the boost fuel cell operating mode can elevate the fuel cell operating temperature and increase the fuel cell power draw, thereby increasing the rate of failure due to thermal stress and oxidation of fuel cell components. In one embodiment, operating the fuel cell in the boost operating mode can degrade the nominal operating life of the fuel cell module 23 by greater than 25%, and more specifically greater than 50% over operating the aerial vehicle 10 in the base operating mode.

During certain situations, it is desirable for the fuel cell module to exceed the base fuel cell upper power limit, for example, to complete a significant mission objective, to maintain the aerial vehicle in flight, or to prevent damage components to the aerial vehicle 10 and therefore, the boost fuel cell operating mode can be selected in these situations. Further, for operations that only occur for short time period, for example when targeting utilizing a laser designator, it may be preferable to operate the aerial vehicle 10 in the boost fuel cell operating mode rather than utilizing a heavier, higher power fuel cells that add weight and volume to the aerial vehicle 10 and that are less efficient during nominal operating conditions of the aerial vehicle 10. Further, it may preferable to operate in the aerial vehicle 10 in the fuel cell boost operating mode to power the propulsion module when at least one of high climb rate or a high velocity is required. For example, high power propulsion may be desired when performing evasive maneuvers, when tracking a target, or for traveling a desired distance in a desired time period.

The directional variance selector 88 allows a user to select an angle of deviation from a straight-line path to a designate a path the aerial vehicle 10 can travel for power conservation purposes. For example, if a straight-line path to a designated waypoint is straight into a headwind, it may be desirable for the aerial vehicle 10 to travel at a deviated path to avoid the headwind and therefore maintain higher state of charge levels within the battery 23 and provide greater levels of power reserve for secondary operations.

The flight speed and altitude display 90 displays the current measured air speed and the climb rate or decent rate of the aerial vehicle 10.

The fuel gage 92 depicts the fuel level ("FUEL") within a fuel tank of the aerial vehicle (not shown). The control system 20 determines the fuel level based on a fuel tank capacity and based on information provided by a microprocessor of the fuel tank and based on the fuel flow rate determined by the fuel flow sensor of the fuel cell module 23.

The fuel level indicator depicts a series of bars such that a ratio of filled-in bars to total bars is indicative of the fuel level within the fuel reservoir.

The flight duration gage 94 displays an estimated operating life of the aerial vehicle 10 until refueling is required. The operating life can be calculated utilizing one of a variety of methods for predicting operating life based on, for example, the fuel level within the fuel reservoir, average fuel consumption levels, short-term and long-term external device load history, power generation, and user defined parameters.

The battery state of charge gage 96 depicts a battery state-of-charge of the battery 21 by showing a series of bars within the battery icon. The battery state-of-charge indicator depicts the series of bars such that a ratio of filled-in bars to total bars is indicative of the state-of-charge of the rechargeable battery 21.

The hybrid power display 98 graphically depicts hybrid power utilizing a plurality of triangle shaped indicia. The plurality of triangle shaped indicia include indicia pointing toward the battery indicating charging and indicia pointing away from the battery indicating discharging. The amount of filled-in indicia indicates the charge/discharge rate.

The battery duration display 99 indicates an amount of time until the battery 21 is discharged to a lower state of charge limit, wherein supplemental power form the battery 21 is not utilized to power electric vehicle components when the battery 21 is fully discharged to the lower state of charge limit.

Figure 5:
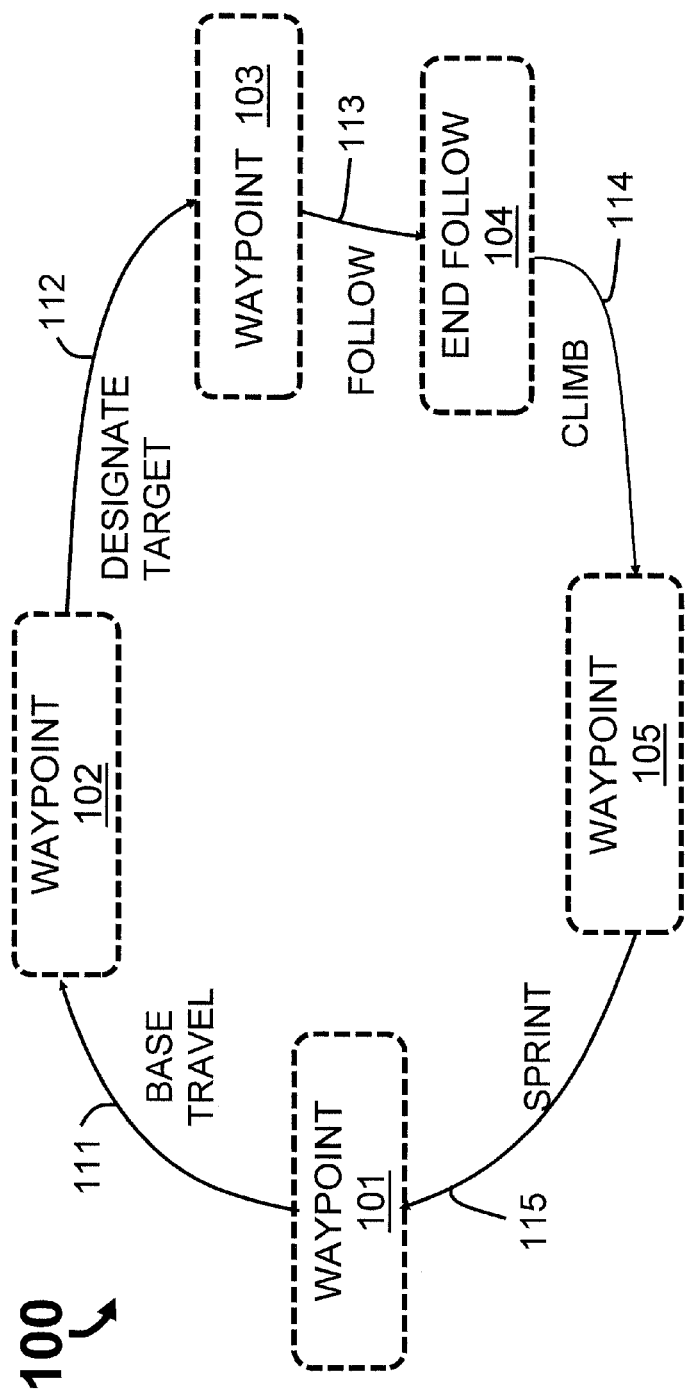
FIG. 5 is a waypoint control map for controlling the aerial vehicle of FIG. 1.

Referring to FIG. 5, a waypoint map 100 depicts waypoints 101, 102, 103, 104, and 105. In an exemplary waypoint based control scheme described herein, the control system 20 selects a mission to be completed operating the aerial vehicle between waypoints. The missions include a base travel mission 111 ('BASE TRAVEL') selected at waypoint 101, a designate target mission 112 ('DESIGNATE TARGET') selected at waypoint 102, a follow mission 113 ('FOLLOW') selected at waypoint 103, a climb mission 114 ('CLIMB') selected at waypoint 104, and a sprint mission 115 ('SPRINT') selected at waypoint 105.

Figure 6:
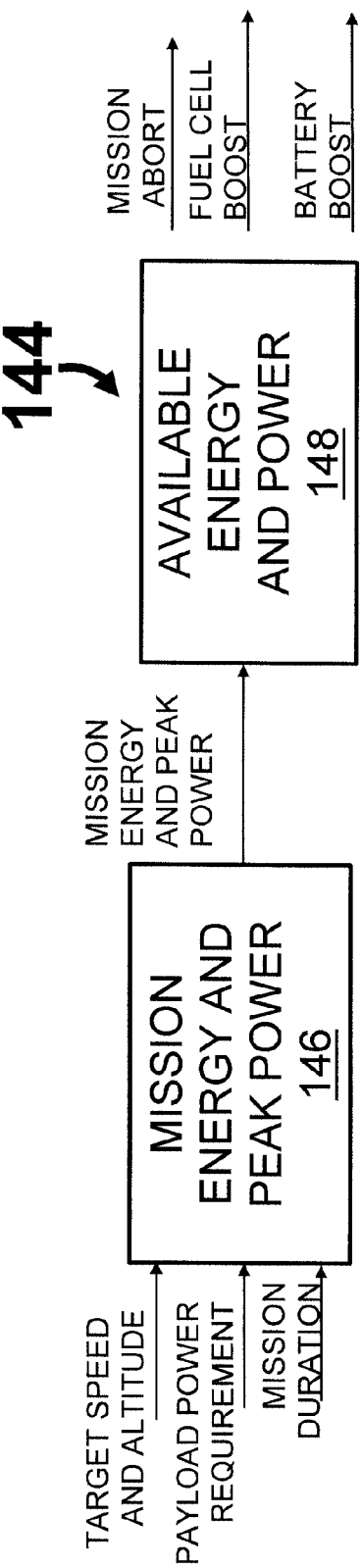
FIG. 6 is a flow chart diagram of a mission energy determination function for controlling the aerial vehicle of FIG. 1.

FIG. 6 shows a mission energy determination function 144. The mission energy determination function 144 includes a total mission energy and peak power calculator 146 ('MISSION ENERGY AND PEAK POWER') and an available system energy and power availability calculator 148 ('AVAILABLE ENERGY AND POWER'). The total mission energy and peak power calculator calculates total mission energy and peak power based on the target speed and target altitude, the payload power requirements for the mission, and the mission duration. The mission energy determination function 144 is executed prior to beginning each mission and is continuously executed during the mission to determine whether sufficient power and energy is available to complete each mission, whether boost commands are required to provide sufficient power and energy to complete each mission, or whether the mission must be aborted due to insufficient power or energy. In one embodiment, the mission determination function calculates power and energy required for a plurality of missions prior to beginning a first mission of the plurality. For example, the mission determination function can calculate the energy required for a designate target mission subsequently followed by a follow mission.

Certain missions described herein are boost-enabled missions in which the control system 20 is permitted to utilize the fuel cell boost operating mode and the battery boost operating mode to complete mission objective. Other missions described herein in are boost disabled missions in which boost can be command to allow flight operation of the aerial vehicle, but cannot be commanded to complete mission objectives. Further, during certain types of missions the mission abort function is unavailable.

Figure 7:
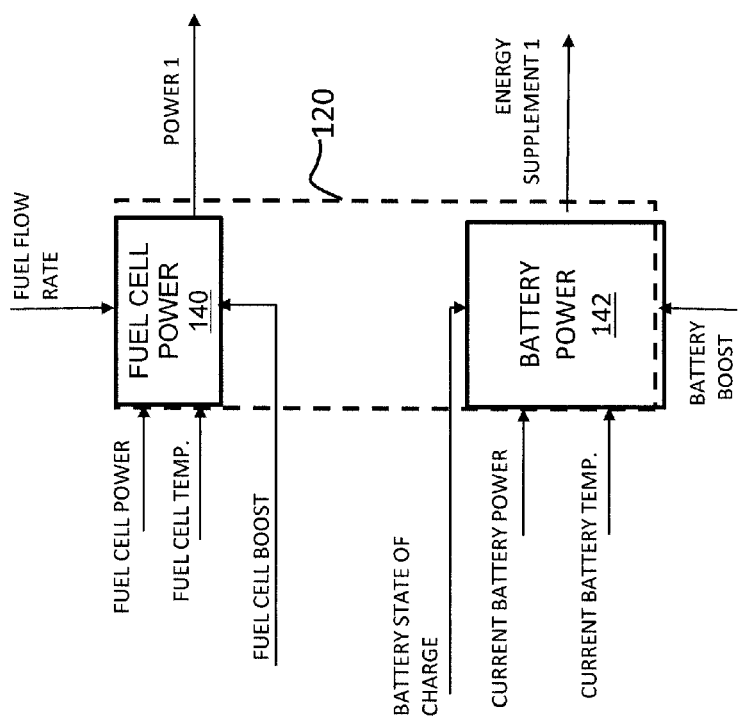
FIG. 7 is a flow chart diagram of a system power and energy function for controlling the aerial vehicle of FIG. 1.

Referring to FIG. 7 a system power and energy function 120 comprises a fuel cell power determination function 140 and a battery energy determination function 142. The fuel cell power determination function 140 determines long-term steady-state power ("POWER 1"), that is overall power continually supplied by the fuel cell module 23 for use by the aerial vehicle 10 based on the measured fuel flow rate ('FUEL FLOW RATE'), the measured fuel cell power, the measured fuel cell temperature, and the signal indicating whether fuel cell boost operating mode is active ('FUEL CELL BOOST'). The fuel cell power determination function 142 determines overall supplemental energy ('SUPPLEMENTAL ENERGY 1') available as battery charge, based on the measure battery state of charge ('BATTERY STATE OF CHARGE'), the measured battery power ('BATTERY POWER'), the measured battery temperature ('BATTERY TEMP.'), and a signal indicative of whether battery boost operating mode is active ('BATTERY BOOST').

The battery power determination function 142 determines the overall battery supplemental energy "Energy Supplement 1" available through battery discharge to supplement the stead-state fuel cell power during the mission. For certain types of missions, the aerial vehicle 10 will operate in a holding pattern at a waypoint to charge the battery above a selected state of charge level (for example, above 95% state of charge) before beginning the mission. Further, during some missions, the battery discharge reserve is determined as a continuous power level applied throughout the duration of the mission. For some missions, a portion of the battery discharge reserve remains in reserve for performing a specific operation during a selected time period of the mission; for example utilizing a laser designator to designate a target.

The fuel cell power function 140 determines overall system power based on a current fuel flow rate ('CURRENT FUEL FLOW RATE'), a current fuel cell power level ('CURRENT FUEL CELL POWER'), a current fuel cell temperature level ('CURRENT FUEL CELL TEMP.'), and a fuel cell boost activation signal ('FUEL CELL BOOST').

The battery power function 142 determines overall battery supplemental energy based on a battery boost activation signal ('BATTERY BOOST'), a current battery power ('CURRENT BATTERY POWER'), and a current battery state of charge ('BATTERY STATE OF CHARGE').

Figure 8:
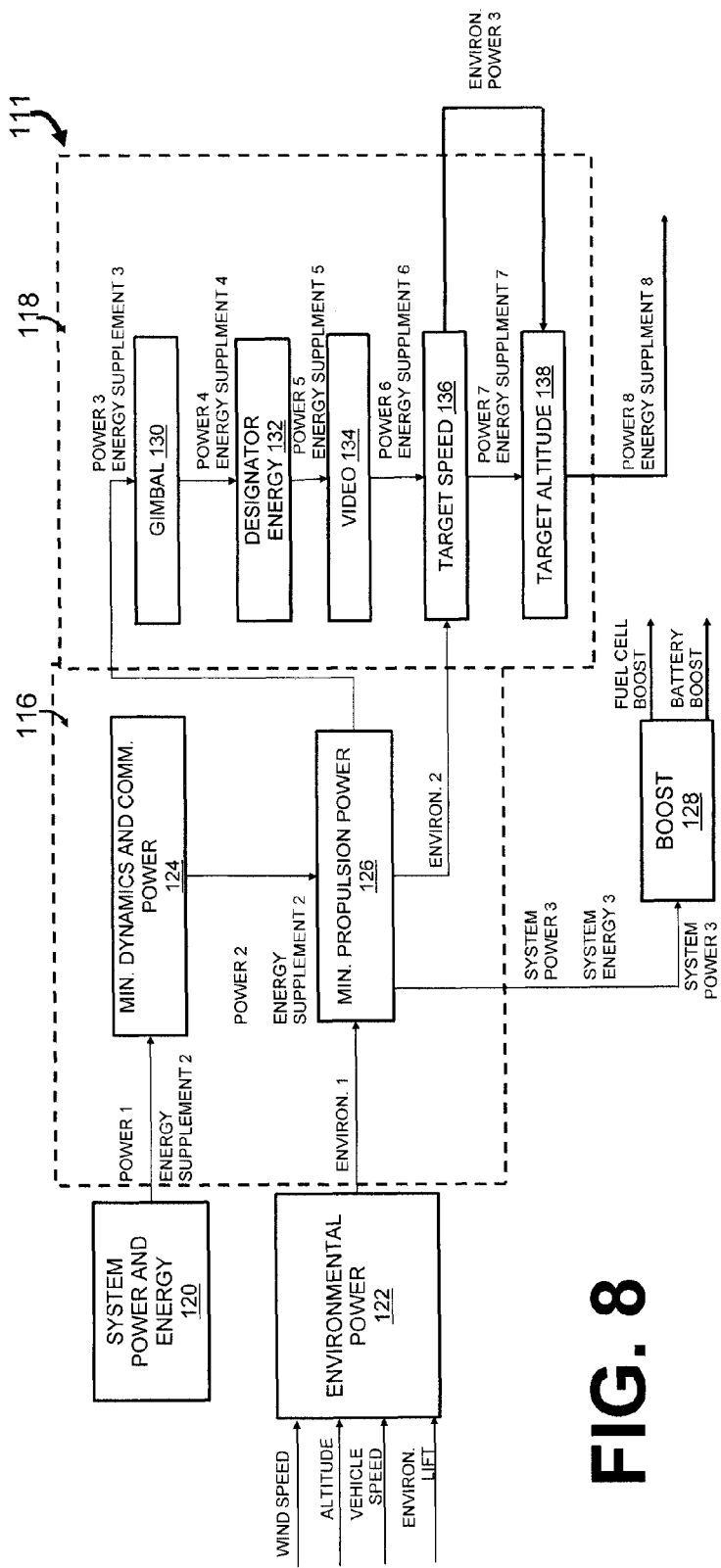
FIG. 8 is a flow chart diagram of a first mission control scheme for controlling the aerial vehicle of FIG. 1.

Referring to FIG. 8, a base travel mission control scheme 111 includes the system power and energy function 120, an environmental power reserve function 122, a flight operation power function 116 and a secondary operation priority function 118. The base travel mission is a standard operating mode for traveling between locations. The base travel mission control scheme 110 actives boost operating mode when boost operating mode is required to maintain the aerial vehicle 10 in flight, but does active boost operating mode to accomplish secondary mission objectives.

The environmental power function 122 determines an overall environmental power reserve ('ENVIRON. POWER 1') based on an aerial vehicle headwind speed, an aerial vehicle altitude, an aerial vehicle speed, and an environmental lift factor. The aerial vehicle altitude and speed can be determined by an onboard global positioning sensor (not shown). The environmental lift factor predicts influences of a thermal current due to altitude changes and due to changes in terrain (determined for example utilizing GPS navigation and reference map software providing information about the terrain. The environmental lift-factor can be calculated based the pitch of the aerial vehicle, the altitude change rate, the propulsion power levels, and the positions of aerial vehicle components.

The flight operation power function 116 determines minimum power levels required to maintain the aerial vehicle 10 in flight. The flight operation power function 116 includes a minimum dynamics and communications power function 124 and a minimum propulsion power function 126.

The minimum dynamics and communications power function 124 subtracts the power and energy levels required to operate the actuators 61 and 62 and the communications system 34 of the aerial vehicle 10 from the overall system power and the overall battery supplemental energy, respectively to determine a second system power ('SYSTEM POWER RESERVE 2') and a second battery supplemental energy ('ENERGY SUPPLEMENT 2'), respectively.

The minimum propulsion power function 126 determines a power requirement for providing propulsion to maintain the aerial vehicle above a lower speed limit and a lower altitude limit, each of which are indicative of minimum requirements required to maintain stable aerial vehicle flight. The environmental power function 122 inputs the overall environmental power reserve and the system power reserve. The minimum propulsion power function 126 determines whether the minimum speed and altitude can be met by the overall environmental power reserve. If the minimum speed and power is exceeded by the overall environmental power reserve, the minimum propulsion power outputs the remaining environmental power reserve ('ENVIRON. POWER 2') to the secondary operation priority functions 118. If the minimum speed and altitude the aerial vehicle 10 cannot be met by the overall environmental power reserve, the control system 20 calculates propulsion power and energy requirement for maintaining the aerial vehicle 10 above the lower speed limit and lower altitude limit and subtracts the propulsion power and energy requirements, respectively from the second system power and the second battery supplemental energy to determine a third system power ('POWER 3') and a third battery supplemental energy ('ENERGY SUPPLEMENT 3'), respectively.

The third system power and the third battery supplemental energy are provided to a boost determination function 128. The boost determination function 128 determines whether to command a fuel cell boost ('FUEL CELL BOOST') to maintain the aerial vehicle in flight based on the third system power. Further, the boost determination function 128 determines whether to command a battery boost signal ('BATTERY BOOST') to activate the fuel cell boost operating mode based on the third battery supplemental energy.

The secondary operation priority functions 118 prioritizes secondary functions including providing sufficient power reserve to continuously operate the gimbaled actuator 130, providing sufficient power to operate the designator for a target designation time period 132, providing sufficient power to operate the video camera continuously 134, providing sufficient power to operate at a target flight speed 136 and at a target flight altitude 138. It is to be understood that battery charge and discharge rate requirements are relatively constant for operating the gimbaled actuator, operating the video camera, and for operating at the target flight speed and altitude and therefore, utilize system power. However, since the laser designator is only operated for a short time period, typically in the range of five minutes or less, the time required for laser-guided munitions to reach the target, and utilizes relatively high levels of power during that time period, the battery discharge rate requirements increases substantially during laser designator operation thereby utilizing battery supplemental charge.

Each of the fourth system power (POWER 4) the fifth system power (POWER 5), the sixth system power reserve (POWER 6), the seventh system power (POWER 7), and the eight system power (POWER 8) indicate system power levels after accounting for the secondary function 130, 132, 134, 136, and 138 respectively. Likewise, each of the fourth battery supplemental energy level (ENERGY SUPPLEMENT 4), the fifth battery supplemental energy level (ENERGY SUPPLEMENT 5), the sixth battery supplemental energy ('ENERGY SUPPLEMENT 6'), the seventh battery supplemental ('ENERGY SUPPLEMENT 7'), and the eighth battery supplemental energy ('ENERGY SUPPLEMENT 8') indicate the battery supplemental energy levels accounting for the secondary function 130, 132, 134, 136, and 138 respectively.

Each of the third system power reserve, the fourth system power reserve (SYSTEM POWER 4), the fifth system power reserve (SYSTEM POWER 5), the sixth system power reserve (SYSTEM POWER LEVEL 6), the seventh system power reserve (SYSTEM POWER LEVEL 7), and the eight system power reserve (SYSTEM POWER LEVEL 8) indicate system power levels after accounting for the secondary function 130, 132, 134, 136, and 138 respectively.

Figure 9:
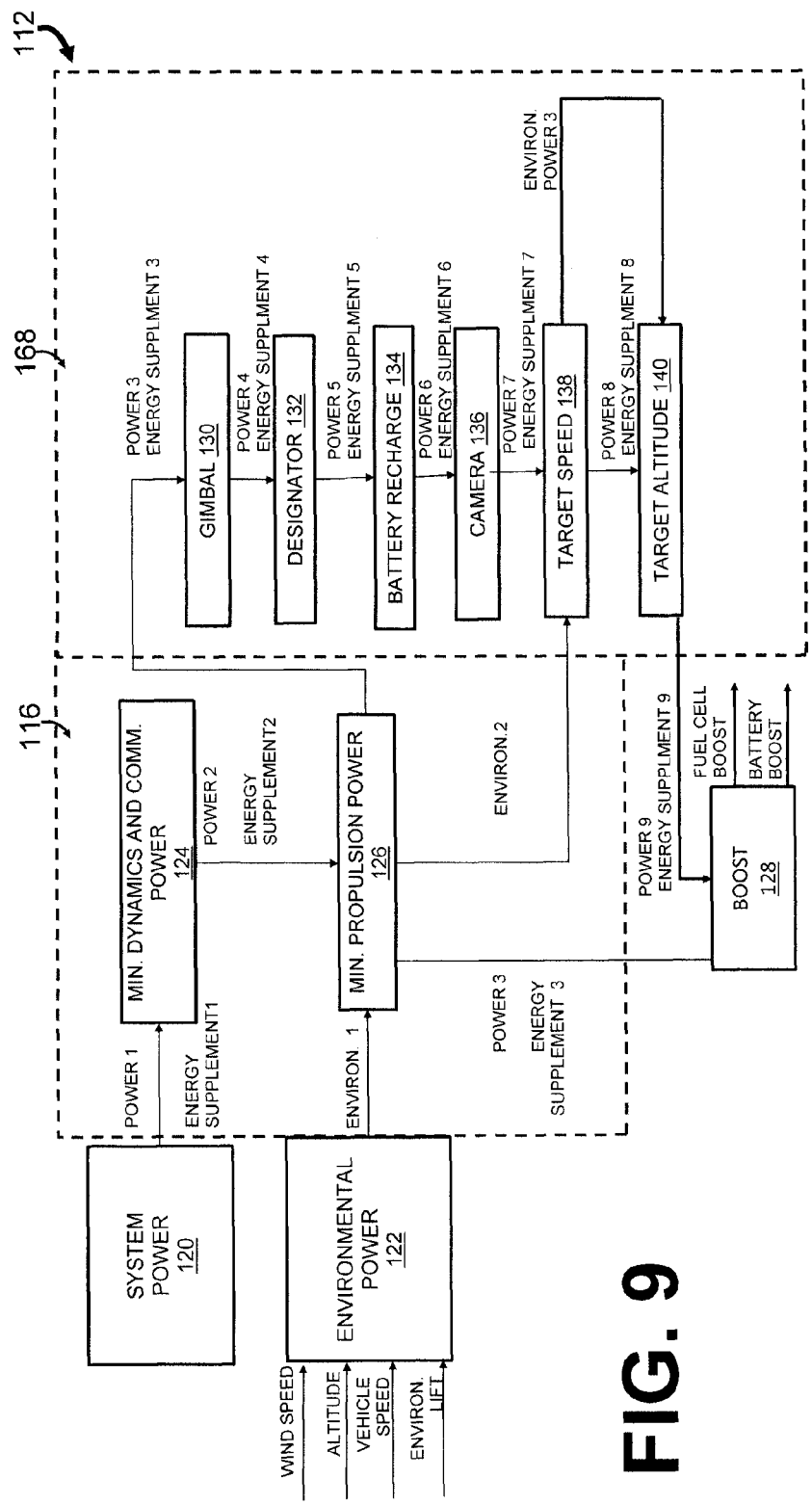
FIG. 9 is a flow chart diagram of a second mission control scheme for controlling the aerial vehicle of FIG. 1.

Referring to FIG. 9, a control scheme for the target designate mission 112 includes the system power reserve function 120, the environmental power reserve function 122, the flight operation power function 116 and a secondary operation priority function 168. The designate target mission pilots the aerial vehicle proximate a target and projects a series of coded laser pulses at the target such that the target can be located by laser-guided munitions. The designate target mission provides boost enablement to accomplish mission objectives. Therefore the ninth system power reserve is utilized by the boost determination function to determine whether sufficient power is required for each of the aerial vehicle secondary operations 130, 132, 134, 136, and 138 during the mission, and the boost determination function output commands to operate in the fuel cell boost operation mode ('FUEL CELL BOOST') and to operate in the battery boost operating mode ('BATTERY BOOST') when the fuel cell boost operating mode and the battery boost operating mode are required to meet mission objectives.

Figure 10A:
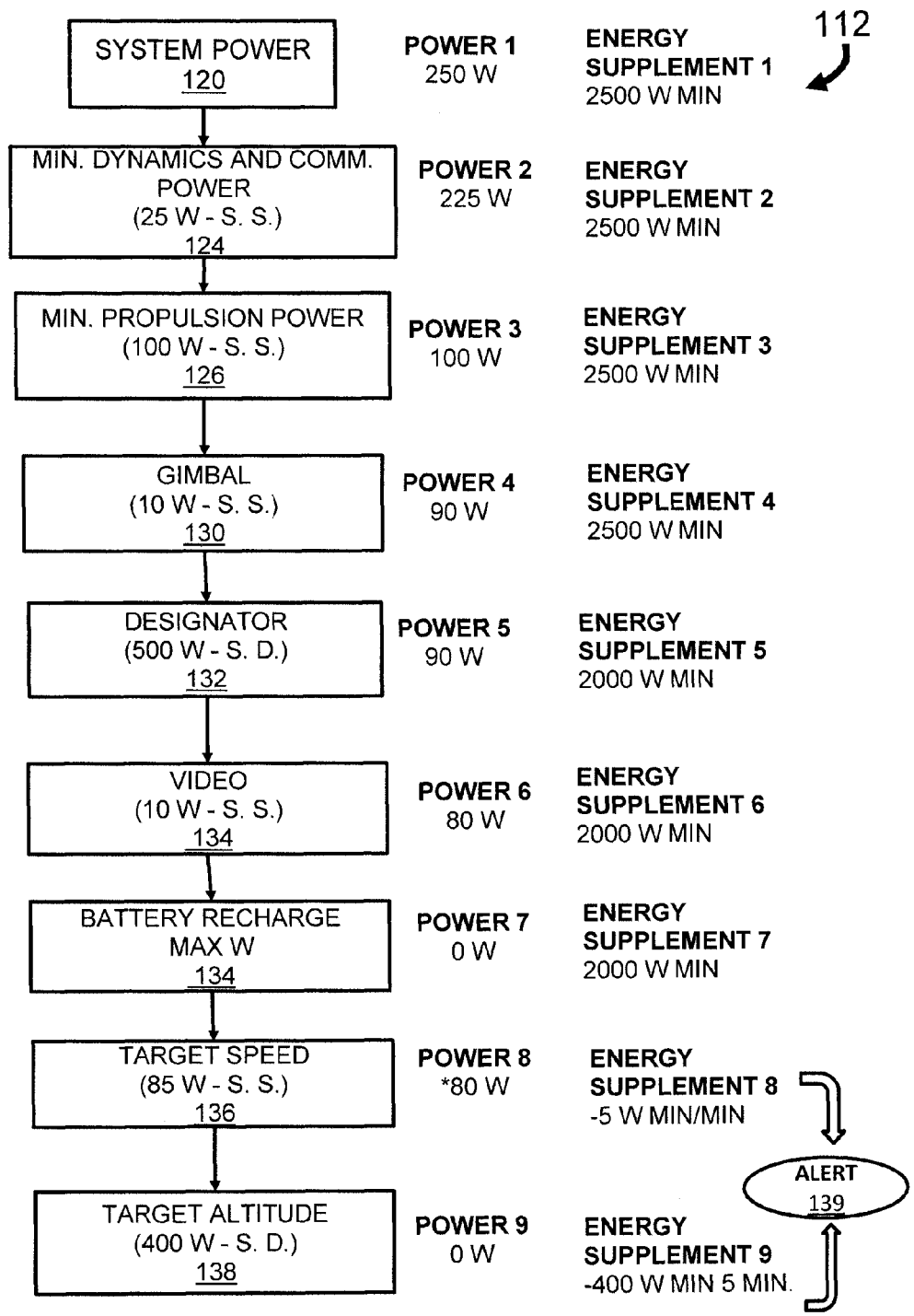
FIG. 10a is a flow chart diagram of the second mission control scheme of FIG. 9 depicting exemplary power levels when operating in a non-boost operating mode.

FIG. 10 A and FIG. 10 B demonstrate show exemplary power levels for the target designate mission 112 control scheme with boost operating mode disabled (FIG. 10 A) and with boost operating mode enabled (FIG. 10 B). Referring to FIG. 10 A, when boost operating mode is disabled, overall system power level is 250 W and the control system 20 subtracts power level the each of the steady state ("S. S.") operation functions 120, 124, 126, 130, and 134 in their prioritized order as shown. Since the battery recharge operation 134 has a high priority level than the target speed function 136 and the target altitude function 138, the control system 10 will not utilize system power to meet speeds and altitude levels above the minimum speed and altitude level unless the battery is fully charged, that is charged to 2500 W min of power. An alert 139 will be sent to a user wherein the user can choose to meet target speeds and altitude levels even when the battery is not fully charged and the user can choose to utilize power from battery discharge to meet the target speed and altitude levels.

Figure 10B:
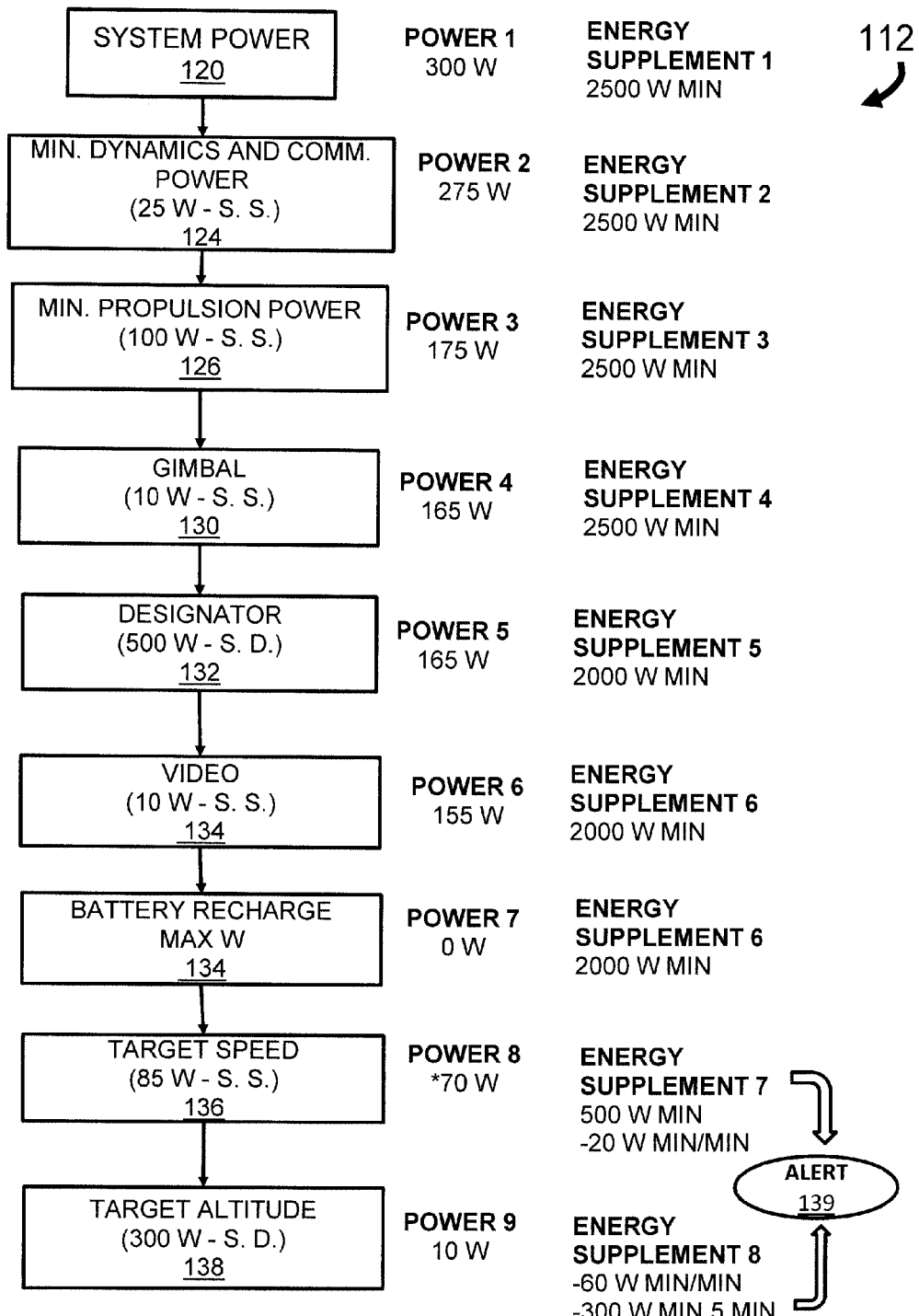
FIG. 10b is a flow chart diagram of the second mission control scheme of FIG. 9 depicting exemplary power levels when operating in a boost operating mode.

Referring to FIG. 10B, the control system can select the boost operating mode to meet mission objectives, thereby allowing the fuel cell to provide 300 W of available system power.

Figure 11:
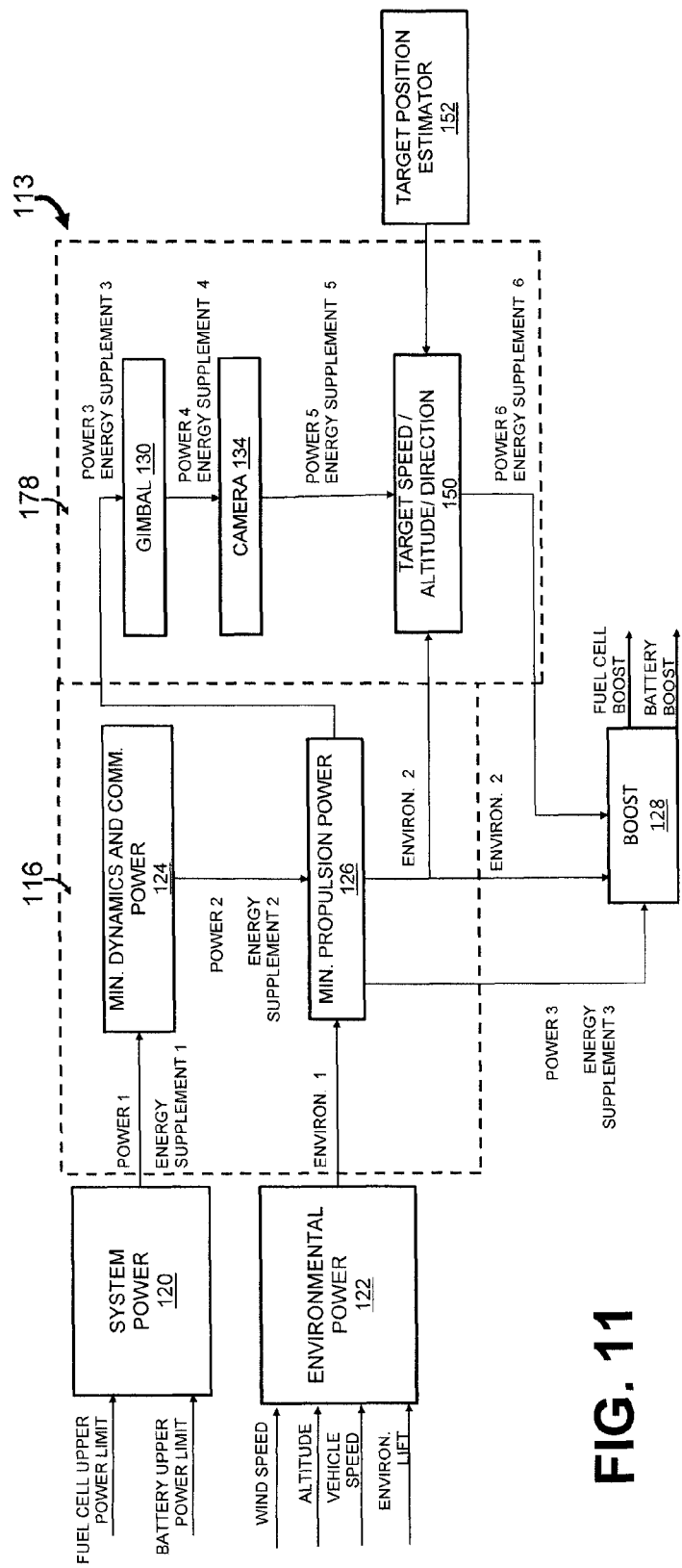
FIG. 11 is a flow chart diagram of a third mission control scheme for controlling the aerial vehicle of FIG. 1.

Referring to FIG. 11, follow mission control scheme 115 includes the system power reserve function 120, the environmental power reserve function 122, the flight operation power function 116 and a secondary operation priority function 178.

The secondary operation power function 178 includes a target speed/altitude/direction determination function 150 that receives a predicted target position from the target position estimator 152 and determines an optimized flight speed, altitude and heading based on the predicted target position. When executing the follow mission 109, the aerial vehicle tracks and follows a target, for example a ground vehicle as is traveling and evasively maneuvering. The follow mission 109 provides boost enablement to accomplish mission objectives. Therefore the sixth system power reserve utilizes by the boost determination function to determine whether sufficient power is required for each of the aerial vehicle secondary operations 130, 134, and 150 during the mission.

Figure 12:
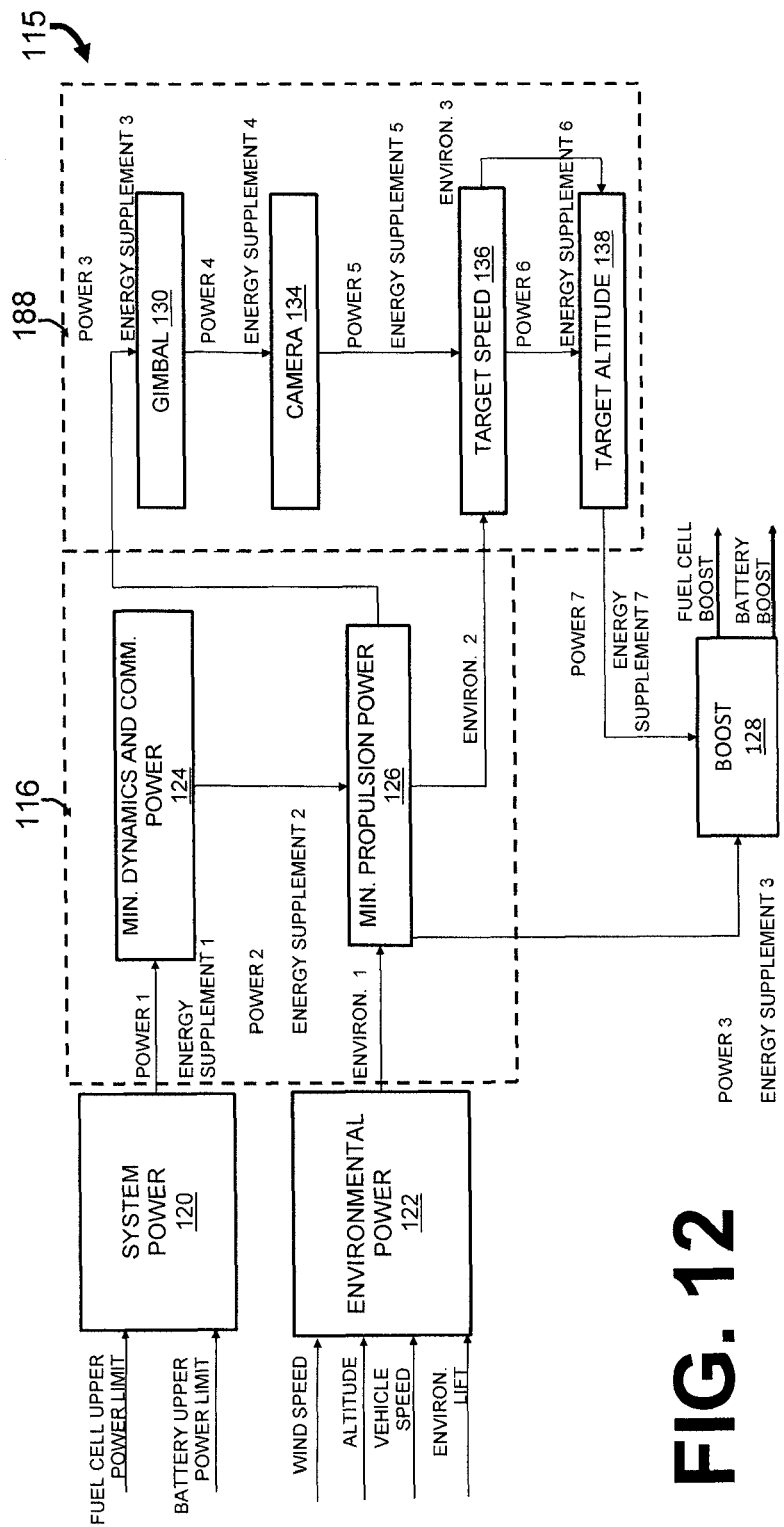
FIG. 12 is a flow chart diagram of a fourth mission control scheme for controlling the aerial vehicle of FIG. 1.
Figure 13:
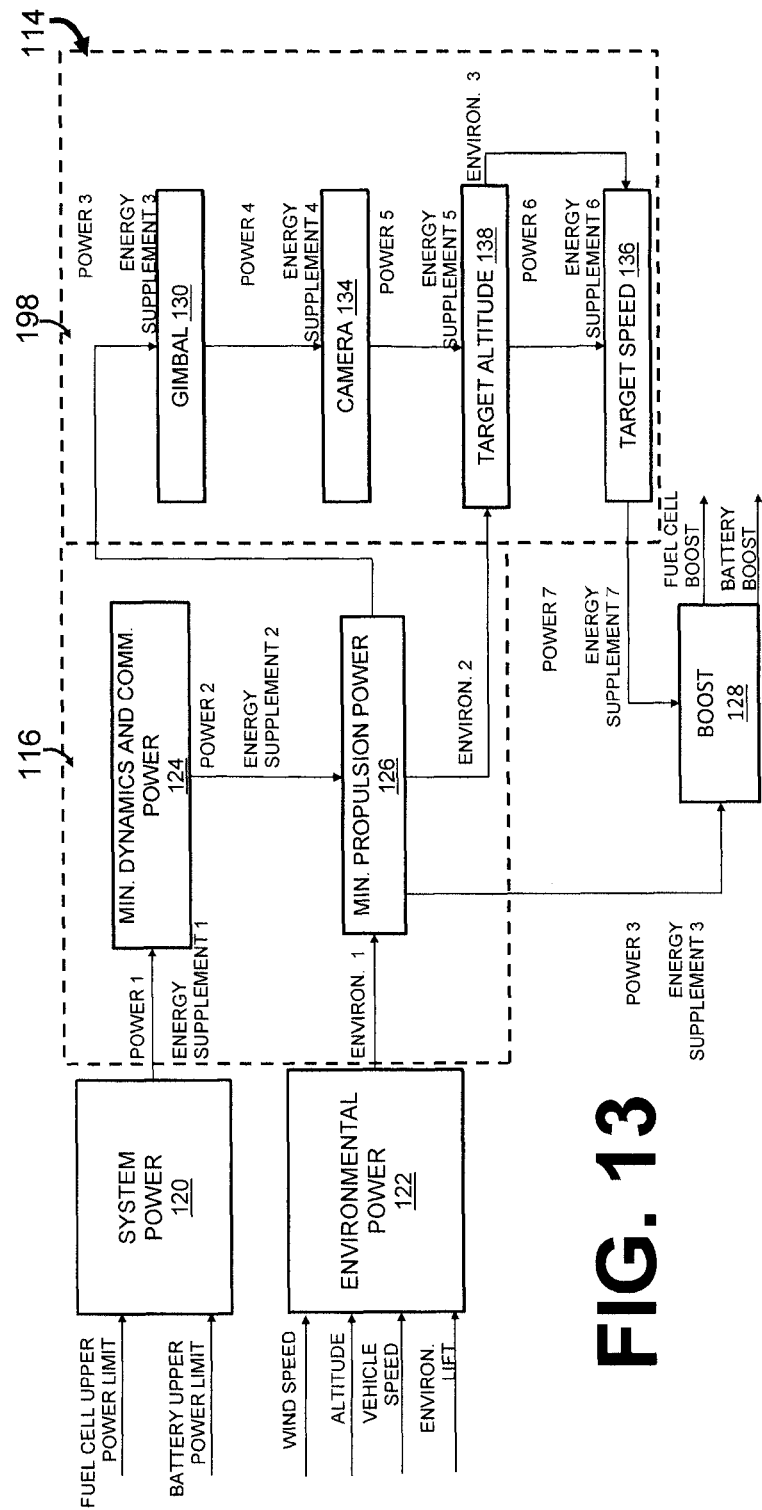
FIG. 13 is a flow chart diagram of a fifth mission control scheme for controlling the aerial vehicle of FIG. 1.

Referring to FIGS. 12 and 13 a climb mission control scheme 116 includes the system power reserve function 120, the environmental power reserve function 122, the flight operation power function 116 and a secondary operation priority function 188 and a sprint mission control scheme 117 includes the system power reserve function 120, the environmental power reserve function 122, the flight operation power function 116 and a secondary operation priority function 198. The control scheme for the climb mission 116 and the sprint mission 117 each allows boost enablement to accomplish mission objectives. Therefore the seventh system power reserve utilizes by the boost determination function to provide sufficient power for each of the aerial vehicle secondary operations 130, 134, 136, and 138 during the mission.

The exemplary embodiments shown in the figures and described above illustrate, but do not limit, the claimed invention. It should be understood that there is no intention to limit the invention to the specific form disclosed; rather, the invention is to cover all modifications, alternative constructions, and equivalents falling within the spirit and scope of the invention as defined in the claims. Therefore, the foregoing description should not be construed to limit the scope of the invention.

The invention claimed is:

1. A method for controlling an aerial vehicle, the aerial vehicle configured to operate in a base fuel cell operating mode and a fuel cell boost operating mode the aerial vehicle comprising a fuel cell and a battery, the fuel cell and the battery each having a respective operational power level for powering components of the aerial vehicle, the method comprising:
   providing a base fuel cell upper power limit;
   controlling the fuel cell power level below the base fuel cell upper power limit when the aerial vehicle is operating in the base fuel cell operating mode; and
   operating the fuel cell above the base fuel cell upper power limit when the aerial vehicle is operating in the fuel cell boost operating, mode.

2. The method of claim 1, further comprising selecting, the fuel cell boost operating mode based on a user input.

3. The method of claim 1, further comprising:
   determining a system power level requirement for operating desired components of the aerial vehicle; and
   selecting the boost operating mode when the system power level requirement for operating desired components of the aerial vehicle is less than the base fuel cell upper power limit.

4. The method of claim 1, further comprising:
   determining a desired battery state of charge; and operating the fuel cell in the boost operating mode to charge the battery to the desired state of charge.

5. The method of claim 1, further comprising operating the aerial vehicle in the boost operating mode to provide power for a secondary operation.

6. The method of claim 5, wherein the secondary operation comprises operating the aerial vehicle at a target speed.

7. The method of claim 5, wherein the second operation comprises operating a laser powered designator power level.

8. The method of claim 1, further comprising:
   calculating a desired mission time duration; and
   operating the aerial vehicle in the boost operating mode to complete the mission in the desired mission time duration.

9. The method of claim 1, further comprising operating the aerial vehicle in the boost operating mode when the aerial vehicle is following a target.

10. The method of claim 1, elevating an operating temperature of the fuel cell when the boost operating mode is selected.

11. The method of claim 1, further comprising increasing a fuel consumption rate when the boost operating mode is selected.

12. The method of claim 11, wherein the fuel cell operating lifetime is degraded by at least 25% when operating in the boost operating mode.

13. The method of claim 1, further comprising
   selecting a first mission;
   operating the aerial vehicle in the boost operating mode during the first mission;
   selecting a second mission; and
   operating the aerial vehicle in the base operating mode dating the second.

14. The method of claim 10 comprising selecting the first mission at a first waypoint and selecting the second mission at a second waypoint.

15. The method of claim 1, further comprising operating the battery above the battery output upper power limit when the aerial vehicle is operating in the fuel cell boost operating mode.

16. A method for controlling an aerial vehicle, the aerial vehicle configured to operate in a base battery operating mode and a battery boost operating mode, the aerial vehicle comprising a fuel cell and a battery, the fuel cell and the battery each having a respective operational power level for powering components of the aerial vehicle, the method comprising:
   providing a base battery upper power limit;
   controlling the battery power level below the base battery upper power limit when the aerial vehicle is operating in the base battery operating mode; and
   operating the battery above the base battery upper power limit when the aerial vehicle is operating in the battery boost operating mode.

17. The method of claim 16, further comprising:
   operating the aerial vehicle in the battery boost operating mode when the aerial vehicle is utilizing a laser designator.

18. The method of claim 16, further comprising:
   operating the aerial vehicle in the battery boost operating mode when the aerial vehicle is following a target.

19. The method of claim 16, further comprising:
   operating the aerial vehicle in the battery boost operating mode when the aerial vehicle is evading.

20. A method for controlling an aerial vehicle, the aerial vehicle configured to operate in a base battery operating mode a battery boost operating mode, a base fuel cell operating mode and a battery boost operating mode, the aerial vehicle comprising a fuel cell and a battery, the fuel cell and the battery each having a respective operational power level for powering components of the aerial vehicle, the method comprising:
   providing a base fuel cell upper power limit;
   providing a base battery upper power limit;
   controlling the fuel cell power level below the base fuel cell upper power limit when the aerial vehicle is operating in the base fuel cell operating mode;

operating the fuel cell above the base fuel cell upper power limit when the aerial vehicle is operating in the fuel cell boost operating mode;
controlling the battery power level below the base battery upper power limit when the aerial vehicle is operating in the base battery operating mode; and operating the fuel cell above the base battery upper power limit when the aerial vehicle is operating in the battery boost operating mode.

* * * * *